(12) United States Patent
Nadeau et al.

(10) Patent No.: US 6,740,992 B2
(45) Date of Patent: May 25, 2004

(54) ELECTRIC MOTOR TORSIONAL DECOUPLING

(75) Inventors: Sylvain Nadeau, London (CA); Bryan Fisher, Ontario (CA); Steve Van Horne, London (CA)

(73) Assignee: Siemens VDO Automotive Inc., Mississauga (CA)

( * ) Notice: Subject to any disclaimer, the term of this patent is extended or adjusted under 35 U.S.C. 154(b) by 12 days.

(21) Appl. No.: 10/079,120

(22) Filed: Feb. 19, 2002

(65) Prior Publication Data

US 2003/0155822 A1 Aug. 21, 2003

(51) Int. Cl.$^7$ .............................. H02K 5/00; H02K 5/24
(52) U.S. Cl. ............................................ 310/51; 310/91
(58) Field of Search .............................. 310/89, 91, 51, 310/68 R; 248/603, 604–606, 14–18, 76; 192/201, 208, 213.2, 70.17; 416/189, 169 R, 500, 244 R

(56) References Cited

U.S. PATENT DOCUMENTS

| | | | |
|---|---|---|---|
| 2,056,676 A | 10/1936 | Kennedy | |
| 2,096,621 A | 10/1937 | Skolfield | |
| 2,452,650 A | 10/1948 | Greenlee | |
| 2,678,031 A | 5/1954 | Spase et al. | |
| 2,881,995 A | 4/1959 | Neher | |
| 2,910,263 A | 10/1959 | Hoekstra | |
| 2,911,962 A | 11/1959 | McRae | |
| 3,506,226 A | 4/1970 | Blomgren | |
| 3,773,265 A | 11/1973 | Morrill | |
| 3,773,285 A * | 11/1973 | Morrill | 248/603 |
| 4,181,472 A * | 1/1980 | Sharp | 417/363 |
| 4,200,257 A | 4/1980 | Litch, III | |
| 4,340,014 A | 7/1982 | Kirchweger | |
| 4,485,888 A | 12/1984 | Yu | |
| 4,651,066 A * | 3/1987 | Gritter et al. | 318/139 |
| 4,825,815 A | 5/1989 | Turner | |
| 4,987,987 A | 1/1991 | Damon et al. | |
| 5,297,936 A | 3/1994 | Sato | |
| 5,492,456 A * | 2/1996 | Knight et al. | 417/360 |
| 5,582,507 A | 12/1996 | Alizadeh | |
| 5,836,277 A | 11/1998 | Kira et al. | |
| 5,861,694 A * | 1/1999 | Niemela | 310/89 |
| 5,953,932 A * | 9/1999 | Kwon | 62/297 |
| 5,959,379 A * | 9/1999 | Hu et al. | 310/51 |
| 5,977,666 A | 11/1999 | Horski et al. | |
| 5,988,994 A | 11/1999 | Berchowitz | |
| 6,055,946 A | 5/2000 | Dombek et al. | |
| 6,076,795 A * | 6/2000 | Scheidel et al. | 248/603 |
| 6,106,228 A | 8/2000 | Bartlett | |
| 6,192,838 B1 | 2/2001 | Matsuo et al. | |
| 6,192,851 B1 | 2/2001 | Asahara et al. | |
| 6,209,692 B1 | 4/2001 | Pels et al. | |
| 6,278,195 B1 | 8/2001 | Yamaguchi et al. | |
| 6,291,949 B1 | 9/2001 | Green | |

\* cited by examiner

*Primary Examiner*—Tran Nguyen

(57) ABSTRACT

A motor assembly 10 includes a DC motor 12 having a motor housing 14 defining a stator, a rotor assembly 18 supported for rotational movement with respect to the stator, and a shaft 22 coupled to the rotor assembly for rotation about an axis of rotation A. The assembly 10 includes a supporting structure 30 carrying the motor and decoupling structure 32. The decoupling structure 32 mounts the motor housing 14 to the supporting structure 30 in a manner to provide a certain natural frequency of the motor in torsion around the axis of rotation A of the shaft 22 while providing natural frequencies higher than the certain natural frequency for degrees of freedom of the motor other than torsion. The assembly 10 also includes pivot structure 44 and 46, associated with the supporting structure and the motor defining a pivot between the motor and the supporting structure with a center of the pivot being aligned with the axis of rotation.

20 Claims, 3 Drawing Sheets

ELECTRIC MOTOR TORSIONAL DECOUPLING

FIELD OF THE INVENTION

The invention relates generally to the reduction of electric motor structure-borne noise in engine cooling applications and, more particularly, to an effective way of isolating the motor's vibration from the rest of the vehicle to reduce in-vehicle structure-borne noise.

BACKGROUND OF THE INVENTION

In typical engine cooling modules, a DC permanent magnet motor is employed to drive a fan. The magnets of the electric motor are subjected to many fluctuating forces. Among these forces are torsional excitations that are typically due to cogging torque and current fluctuations when a pulse width modulated (PWM) signal is used for speed control. These torsional excitations generate vibration in the motor housing that can be transmitted to other components and thus, generate noise. Electric motor structure-borne noise is an important contributor to in-vehicle noise, vibration and sound quality in various conditions such as during an idle condition.

Accordingly, there is a need to provide decoupling structure to reduce the motor structure-borne noise in engine cooling applications while constraining translation of the motor.

SUMMARY OF THE INVENTION

An object of the invention is to fulfill the need referred to above. In accordance with the principles of the present invention, this objective is achieved by providing a motor assembly having a DC motor. The motor includes a motor housing defining a stator, a rotor assembly supported for rotational movement with respect to the stator, and a shaft coupled to the rotor assembly for rotation about an axis of rotation. The assembly includes a supporting structure carrying the motor and decoupling structure. The decoupling structure mounts the motor housing to the supporting structure in a manner to provide a certain natural frequency of the motor in torsion around the axis of rotation of the shaft while providing natural frequencies higher than the certain natural frequency for degrees of freedom of the motor other than torsion. The assembly also includes pivot structure associated with the supporting structure and the motor defining a pivot between the motor and the supporting structure with a center of the pivot being aligned with the axis of rotation.

In accordance with another aspect of the invention, a method of controlling vibration of a motor assembly is provided. The motor assembly includes a DC motor having a motor housing defining a stator; a rotor assembly supported for rotational movement with respect to the stator, and a shaft coupled to the rotor assembly for rotation about an axis of rotation. The method includes coupling the motor housing to a supporting structure via springs so as to provide a certain natural frequency of the motor in torsion around the axis of rotation of the shaft while providing natural frequencies higher than the certain natural frequency for degrees of freedom of the motor other than torsion, and providing a pivot between the motor and the supporting structure with a center of the pivot being aligned with the axis of rotation.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE PREFERRED EMBODIMENT

Figure 1:
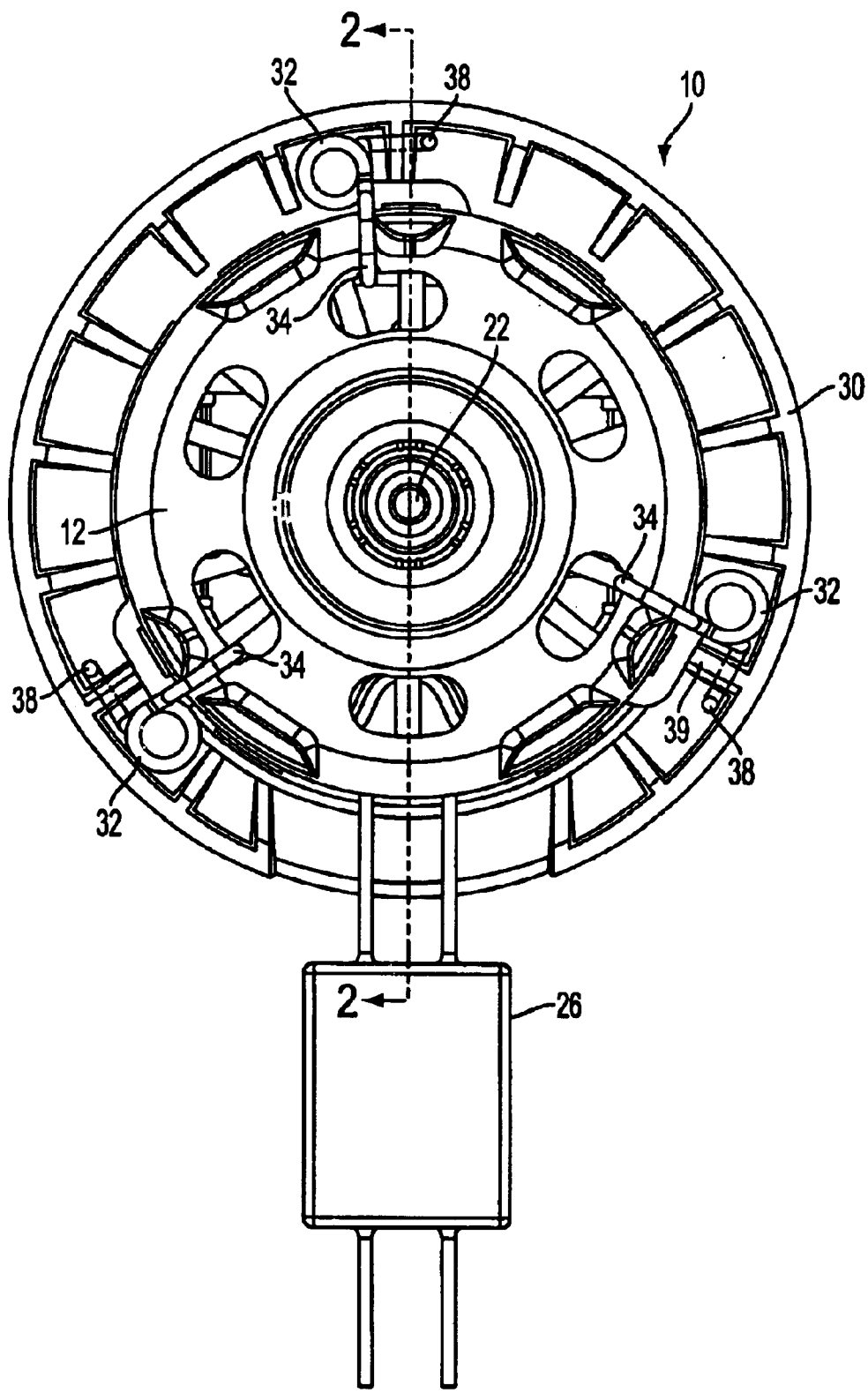
FIG. 1 is an end view of an electric motor mounted to supporting structure, in accordance with a first embodiment of the invention.
Figure 2:
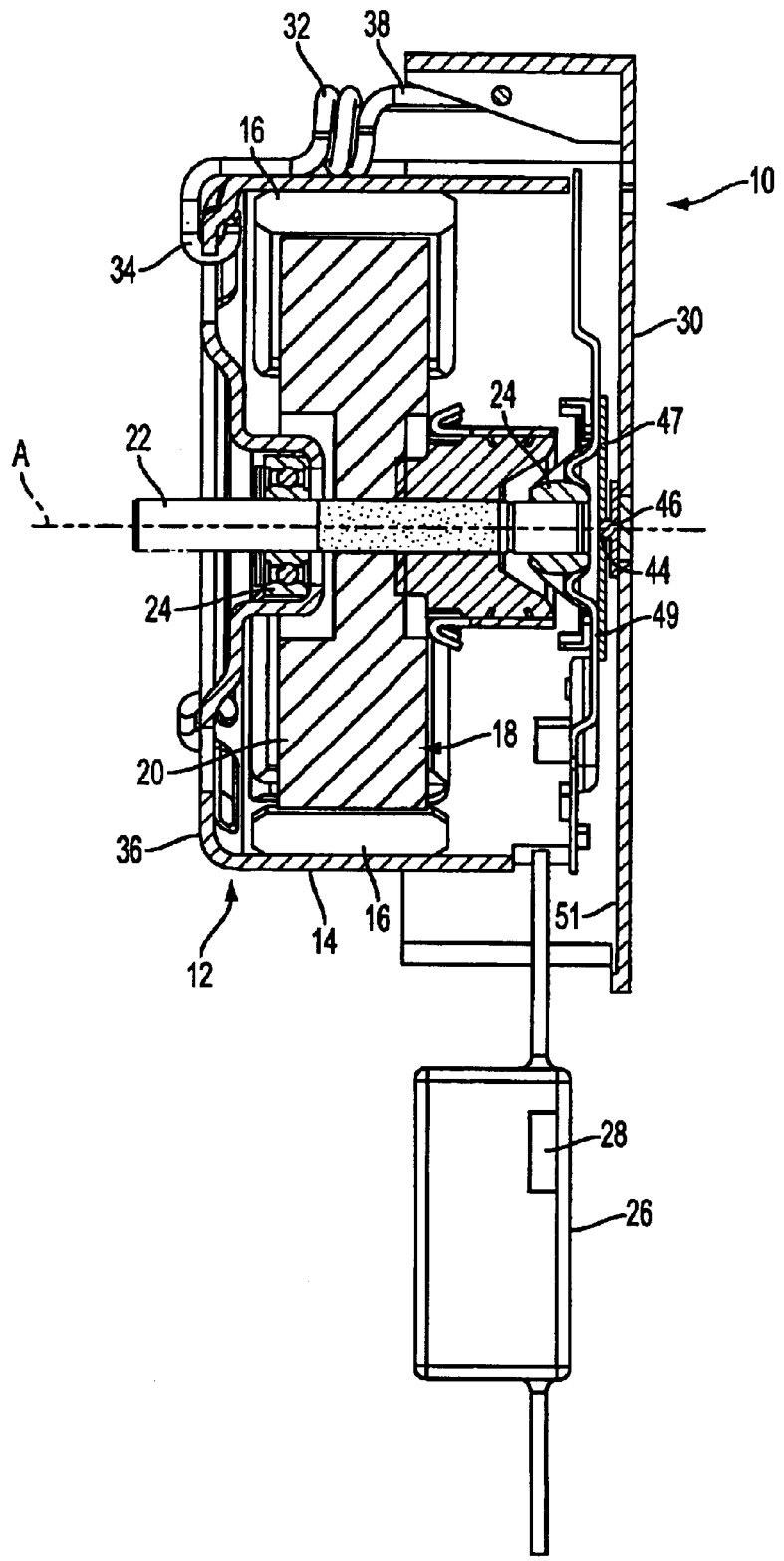
FIG. 2 is a cross-sectional view taken along the line 2—2 in FIG. 1.

With reference to FIGS. 1 and 2, a motor assembly is shown, generally indicated at 10, in accordance with the principles of the present invention. The assembly 10 includes a DC motor 12 having a motor housing 14 defining a stator. In the illustrated embodiment, the stator includes permanent magnets 16 fixed to an interior surface of the motor housing 14. A rotor assembly, generally indicated at 18, is supported for rotational movement with respect to the stator. In the embodiment, the rotor assembly 18 includes the conventional armature 20. A shaft 22 is coupled to the armature for rotation about an axis of rotation A. The shaft 22 is supported by bearings 24 at each end thereof and is constructed and arranged to drive a cooling fan (not shown). In an alternative embodiment of the motor (not shown), the permanent magnets can be associated with the rotor assembly and the armature can be associated with the stator.

An electronics housing 26 is coupled to the motor 12 and preferably contains a pulse width modulated (PWM) switch 28. The switch 28 can be a MOSFET device, a bipolar junction transistor, a thyristor, or the like. The operation of the switch 18 is controlled by an electronic controller of the vehicle to control current to the motor 12 and operate the motor 12 at various speeds. The electronic can be contained in the housing 26 separate from the motor or can be provide in the motor 12 itself.

A supporting structure 30 carries the DC motor 12. The supporting structure 30 is preferably part of a shroud structure employed to mount the motor 12 and to protect fan blades within an engine compartment of a vehicle in the conventional manner.

The assembly 10 includes decoupling structure 32 that mounts the motor housing 16 to the supporting structure 30 in a manner to provide a low natural frequency of the motor 12 in torsion around the axis of rotation A of the shaft 22 while providing natural frequencies higher than the low natural frequency for degrees of freedom of the motor 12 other than torsion. The low natural frequency of the decoupled motor around the axis of rotation A depends on the excitation frequency of interest. A natural frequency of at least 1.4 times less than the lowest frequency of excitation to be isolated is generally required. Preferably, the natural frequency is at least 3 times less than the lowest frequency of excitation to be isolated.

In the embodiment illustrated in FIG. 1, the decoupling structure comprises three torsion springs 32 mounted generally 120 degrees apart. Each spring 32 has one end 34 hooked to the motor housing 14 at a first end 36 of the motor 12 with another end 38 of the spring 32 being coupled to studs 39 molded into the supporting structure 30. The springs 32 are in tension. Thus, the springs 32 minimize the vibration transmitted from the motor 12 to the supporting structure 30. The springs 32 create a low natural frequency decoupling around the axis of rotation A while keeping the other natural frequencies as high as possible in order to minimize displacement in those directions. It can be appreciated that a various number of springs 32 can be provided, such as, for example, four or six springs.

The assembly 10 includes pivot structure, associated with the supporting structure 30 and the motor 12, constructed and arranged to provide a pivot between the motor 12 and the supporting structure. In the embodiment of FIG. 2, the pivot structure includes a recess 44 and a projection 46. The recess 44 is provided in a plate 47 at end 49 of the motor 12. The recess 44 receives the projection 46 that extends from the supporting structure 30. In the embodiment of FIG. 2, the projection 46 is formed as a pin having a rounded end. The pin is coupled to an inner surface 51 of the supporting structure 30 and the rounded end of the pin mates with the recess 44 that has a concave surface. The force of the springs 32 maintains the pin 46 in the recess 44.

Figure 3:
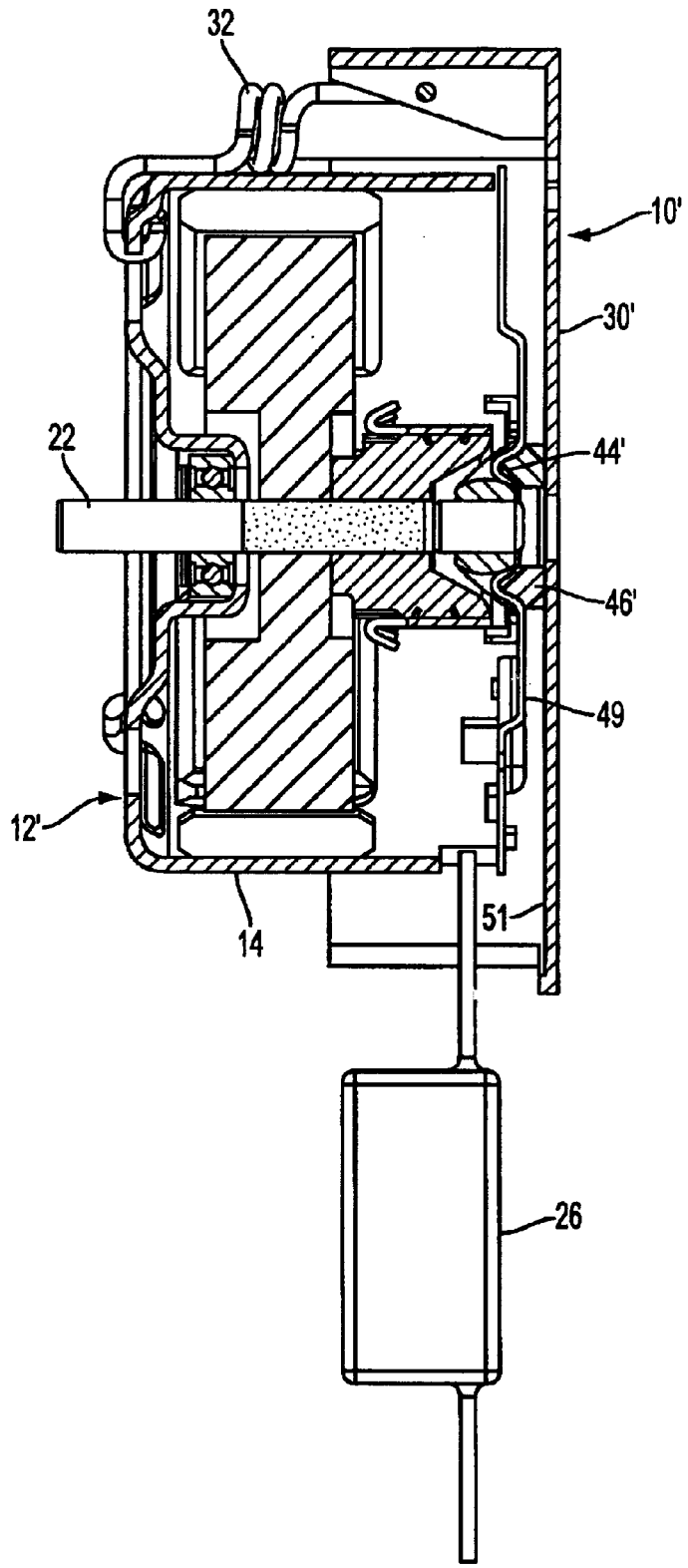
FIG. 3 is a cross-sectional view of an electric motor mounted to supporting structure, in accordance with a second embodiment of the invention.

With reference to FIG. 3, a second embodiment of the pivot structure is shown. All other parts of the motor assembly 10' of FIG. 3 are the same as discussed above with regard to the motor assembly 10 of FIGS. 1 and 2 and need not be repeated here. In FIG. 3, the recess 44' is in the form of a circular groove in end 49 of the motor 12'. The projection 46' is in the form of a toroid extending from the inner surface 51 of the supporting structure 30 so as to be received in the circular groove 44'.

The projection (e.g., pin 46 or toroid 46') can be molded into the supporting structure 30 or can be provided as a separate part. It can be appreciated that the parts of the pivot structure can be reversed, with the projection 46 or 46' being provided on the motor so as to contact a surface of the supporting structure 30. To reduce torsion of the motor, the center of the pivot between the motor 12 and the supporting structure 30 is aligned with the axis A of rotation of the shaft 22.

Since there is no rigid connection between the motor 12 and the supporting structure 30, motor structure-borne noise in an engine cooling application is reduced, with the pivot structure permitting pivoting of the motor with respect to the supporting structure 30.

It can be appreciated that damping can be added to the motor assembly 10, for example, by covering the springs 32 with rubber or other flexible material without departing from the spirit of the invention. It can also be appreciated that displacement limiters can be used in order to further restrict the motor movement without departing from the spirit of this invention.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A motor assembly comprising:
   a DC motor including:
      a motor housing defining a stator,
      a rotor assembly supported for rotational movement with respect to the stator, and
      a shaft coupled to the rotor assembly for rotation about an axis of rotation, a supporting structure carrying the motor;
   decoupling structure mounting the motor housing to the supporting structure in a manner to provide a predetermined natural frequency of the motor in torsion around the axis of rotation of the shaft while providing natural frequencies higher than the predetermined natural frequency of the motor other than torsion, and
   pivot structure, associated with the supporting structure and the motor, defining a pivot permitting pivoting of the motor with respect to the supporting structure, with a center of the pivot being aligned with the axis of rotation.

2. The motor assembly of claim 1, wherein decoupling structure comprises a plurality of torsion springs, each spring having one end coupled to the motor housing at a first end of the motor with another end of the spring being coupled to the supporting structure.

3. The motor assembly of claim 2, wherein three torsional springs are provided generally 120 degrees apart.

4. A motor assembly comprising:
   a DC motor including:
      a motor housing defining a stator,
      a rotor assembly supported for rotational movement with respect to the stator, and
      a shaft coupled to the rotor assembly for rotation about an axis of rotation,
      a supporting structure carrying the motor;
   decoupling structure mounting the motor housing to the supporting structure in a manner to provide a predetermined natural frequency of the motor in torsion around the axis of rotation of the shaft while providing natural frequencies higher than the predetermined natural frequency of the motor other than torsion, and
   pivot structure, associated with the supporting structure and the motor, defining a pivot permitting pivoting of the motor with respect to the supporting structure, with a center of the pivot being aligned with the axis of rotation,
   wherein decoupling structure comprises a plurality of torsion springs, each spring having one end coupled to the motor housing at a first end of the motor with another end of the spring being coupled to the supporting structure,
   wherein the pivot structure includes:
      a recess provided in an end of the motor opposite the first end thereof, and
      a projection extending from the supporting structure and being received in the recess, with the torsion spring maintaining the projection in the recess.

5. The motor assembly of claim 4, wherein the projection is formed as a pin having a rounded end and the recess is defined by a concave surface.

6. The motor assembly of claim 4, wherein the projection is formed as toroid and the recess is a generally circular groove.

7. The motor assembly of claim 1, wherein rotor assembly includes an armature and the stator includes permanent magnets.

8. The motor assembly of claim 1, further including a switch for controlling speed of the motor.

9. The motor assembly of claim 8, wherein the switch is constructed and arranged to be controlled by a pulse width modulated signal.

10. A motor assembly comprising:
- a DC motor including:
  - a motor housing defining a stator,
  - a rotor assembly supported for rotational movement with respect to the stator, and
  - a shaft coupled to the rotor assembly for rotation about an axis of rotation, a supporting structure carrying the motor;
- means for coupling the motor housing to the supporting structure in a manner to provide a predetermined natural frequency of the motor in torsion around the axis of rotation of the shaft while providing natural frequencies higher than the predetermined natural frequency of the motor other than torsion, and
- means, associated with the supporting structure and the motor, for permitting pivoting of the motor with respect to the supporting structure, the means for permitting pivoting defining a pivot, with a center of the pivot being aligned with the axis of rotation.

11. The motor assembly of claim 10, wherein the means for coupling comprises a plurality of torsion springs, each spring having one end coupled to the motor housing at a first end of the motor with another end of the spring being coupled to the supporting structure.

12. The motor assembly of claim 11, wherein three torsional springs are provided generally 120 degrees apart.

13. A motor assembly comprising:
- a DC motor including:
  - a motor housing defining a stator,
  - a rotor assembly supported for rotational movement with respect to the stator, and
  - a shaft coupled to the rotor assembly for rotation about an axis of rotation, a supporting structure carrying the motor;
- means for coupling the motor housing to the supporting structure in a manner to provide a predetermined natural frequency of the motor in torsion around the axis of rotation of the shaft while providing natural frequencies higher than the predetermined natural frequency of the motor other than torsion, and
- means, associated with the supporting structure and the motor, for permitting pivoting of the motor with respect to the supporting structure,
- wherein the means for coupling comprises a plurality of torsion springs, each spring having one end coupled to the motor housing at a first end of the motor with another end of the spring being coupled to the supporting structure,
- wherein the means for permitting pivoting includes:
  - a recess provided in an end of the motor opposite the first end thereof, and
  - a projection extending from the supporting structure and being received in the recess, with the torsion springs maintaining the projection in the recess, the recess and projection defining a pivot with a center of the pivot being aligned with the axis of rotation.

14. The motor assembly of claim 13, wherein the projection is formed as a pin having a rounded end and the recess is defined by a concave surface.

15. The motor assembly of claim 13, wherein the projection is formed as toroid and the recess is a generally circular groove.

16. The motor assembly of claim 10, wherein rotor assembly includes an armature and the stator includes permanent magnets.

17. The motor assembly of claim 10, further including a switch for controlling speed of the motor.

18. The motor assembly of claim 17, wherein the switch is constructed and arranged to be controlled by a pulse width modulated signal.

19. A method of controlling vibration of a motor assembly, the motor assembly includes a DC motor having a motor housing defining a stator; a rotor assembly supported for rotational movement with respect to the stator, and a shaft coupled to the rotor assembly for rotation about an axis of rotation, the method including:
- coupling the motor housing to a supporting structure, carrying the motor, via springs so as to provide a predetermined natural frequency of the motor in torsion around the axis of rotation of the shaft while providing natural frequencies higher than the predetermined natural frequency of the motor other than torsion, and
- providing a pivot between the motor and the supporting structure so that the motor can pivot with respect to the supporting structure, wherein a center of the pivot is aligned with the axis of rotation.

20. A method of controlling vibration of a motor assembly, the motor assembly includes a DC motor having a motor housing defining a stator, a rotor assembly supported for rotational movement with respect to the stator, and a shaft coupled to the rotor assembly for rotation about an axis of rotation, the method including:
- coupling the motor housing to a supporting structure, carrying the motor, via springs so as to provide a predetermined natural frequency of the motor in torsion around the axis of rotation of the shaft while providing natural freguencies higher than the predetermined natural frequency of the motor other than torsion, and
- providing a pivot between the motor and the supporting structure so that the motor can pivot with respect to the supporting structure, wherein a center of the pivot is aligned with the axis of rotation.
- wherein the step of providing a pivot includes providing a projection extending from the supporting structure that is received in a recess defined in an end of the motor, the springs maintaining the projection in the recess.

* * * * *